May 1, 1962 S. R. PHILLIPS 3,032,364
SWIVELLED HOOK FOR A TRAVELLING BLOCK
Filed Dec. 12, 1958

*INVENTOR.*
SAMUEL R. PHILLIPS
BY
ATTORNEY 3,032,364
SWIVELLED HOOK FOR A TRAVELLING BLOCK
Samuel R. Phillips, Houston, Tex., assignor to Joy Manufacturing Company, Pittsburgh, Pa., a corporation of Pennsylvania
Filed Dec. 12, 1958, Ser. No. 780,154
3 Claims. (Cl. 294—82)

This invention relates to traveling blocks and more particularly to a swivelled load carrying hook for a traveling block, having an improved swivel bearing mounting.

In traveling blocks such as those used with oil well drilling equipment a load carrying hook is usually swivelly mounted on a block part connected to a "jumping out" spring mechanism, used to separate drill pipe sections upon uncoupling of the joints of a drill string. The swivelly and spring mounted hook may also be employed with other types of equipment such as cranes and the spring mounting at that time may be used for shock absorbing purposes.

In accordance with the present invention the swivelly mounted load carrying member or hook when unloaded is free to turn about an upright axis on an anti-friction bearing relative to the block body, and at times it is desirable to lock the unloaded hook against swivelling movement and a manually operable lock is provided for this purpose. When the hook is under a very light load it is free to swivel on its bearing mounting but when the hook receives a relatively heavy load the hook is shifted from its anti-friction bearing mounting to the part of the block connected to the spring mounting without free swivelling. In other words, the load carrying hook is free to swivel on its bearing mounting only when it is subjected to a very light load. Further, the invention embodies an improved detachable mounting structure for a load carrying hook.

A primary object of the present invention is to provide an improved traveling block structure. Another object is to provide an improved swivel bearing mounting for a load carrying hook of a traveling block. A further object is to provide an improved swivel bearing mounting for a load carrying hook in cooperation with improved transfer or load divider means whereby the hook when lightly loaded is free to swivel on its bearing but which when heavily loaded is non-swivelly supported directly by a part of the block independently of its swivel bearing. Still another object is to provide an improved detachable mounting structure for a load carrying hook. These and other objects and advantages of the invention will, however, hereinafter more fully appear.

In the accompanying drawings there is shown for purposes of illustration one form which the invention may assume in practice.

The traveling block may assume various forms but is herein desirably similar to that disclosed in my copending application Serial No. 780,153, filed December 12, 1958. Evidently the invention may be embodied in devices other than traveling blocks and may be associated with load carrying members other than hooks.

As disclosed in my copending application the block casing carries a spring mounting desirably an air spring 1 arranged between a part 2 of the block body and a vertically movable part 3 depending from the spring mounting, and a load carrying member 4 is supported by the movable block part 3 and is desirably in the form of a hook which for illustrative purposes may be similar to that shown in my application Serial No. 780,153 above referred to.

Figure 1:
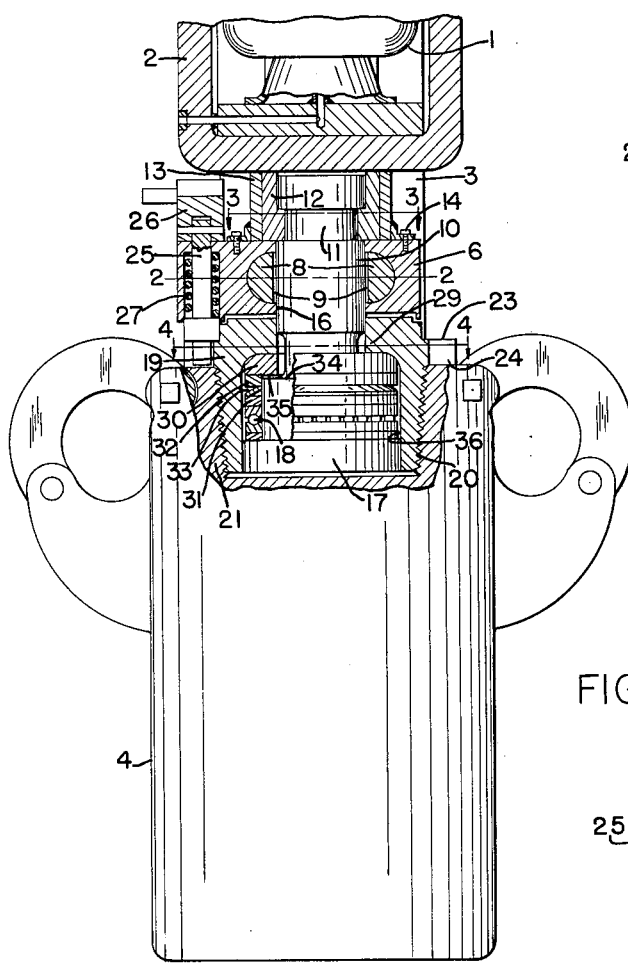
FIG. 1 is a fragmentary axial section through a traveling block illustrating the improved swivel bearing mounting for the load carrying hook.
Figure 2:
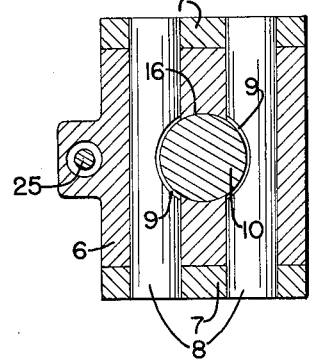
FIG. 2 is a cross section taken on line 2—2 of FIG. 1 illustrating structural details.
Figure 3:
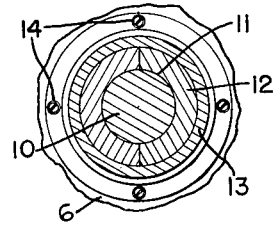
FIG. 3 is a fragmentary cross section taken on line 3—3 of FIG. 1, showing the split retaining ring for the swivel pin.
Figure 4:
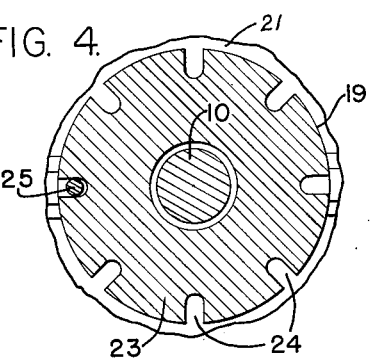
FIG. 4 is a cross section taken on line 4—4 of FIG. 1, showing the block for the swiveled hook.

The hook has an improved detachable swivel bearing mounting from the block part 3 comprising a swivel block 6 detachably secured to parallel depending side portions 7 of the block part 3 by parallel cross pins 8 passing through aligned openings in the side portions 7 and the swivel block 6, as shown in FIG. 2. The inner adjacent sides of the parallel pins 8 are arcuately grooved at 9, and a vertical swivel pin 10 passes up through these grooves between the cross pins to hold the cross pins against axial displacement. The upper portion of the swivel pin 10 is annularly grooved at 11 and a split sleeve or ring 12 has an inwardly directed flange received in the annular pin groove, to support the swivel pin on the top of the swivel block 6. A retaining ring or sleeve 13 surrounds the split ring to hold the parts thereof together and the ring 13 has a bottom flange secured as by screws 14 to the top of the swivel block 6. The swivel pin 10 extends downwardly through a central opening 16 in the swivel block 6 and has an enlarged circular bottom head 17 which supports an anti-friction bearing 18 on which a loading plug 19 is mounted to turn about the vertical axial line of the swivel pin 10. The loading plug 19 is suitably secured as by tapered threads 20 to the body 21 of the load receiving hook 4. The loading plug 19 has a circular flange 23 (FIGS. 1 and 4) which is peripherally recessed or notched at 24 at points spaced circumferentially thereabout. Mounted in an upright bore within the swivel block 6 is a rod 25 operated by a cam member 26 provided with a suitable operating handle, and a spring 27 in the bore urges the rod 25 in a downward direction. When the rod 25 is lowered by the cam it may project within one of the notches 24 to lock the swivelled loading plug 19 against rotation about the vertical axial line of the swivel pin 10.

Figure 5:
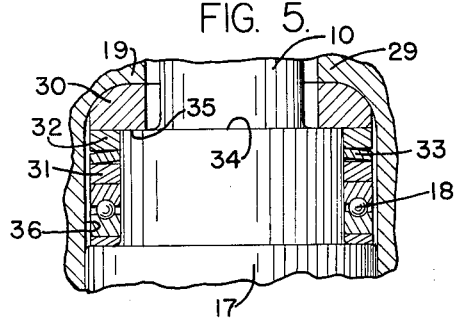
FIG. 5 is an enlarged fragmentary section taken in the plane of FIG. 1, showing the moving parts in the position assumed when the hook is heavily loaded.

Now referring to the improved swivel bearing mounting for the load carrying member or hook 4 it will be noted that the loading plug 19 has an inwardly directed upper flange 29 which rests on an annulus 30 in the form of a ring-like washer. Supported by the top race of the anti-friction bearing 18 is an annular member or ring 31 and interposed between this ring and a similar upper ring 32 is a spring 33 which is desirably of the type known as a "Belleville" spring. When the load carrying hook is lightly loaded the spring 33 holds the upper ring 32 in raised position above a horizontal upwardly facing shoulder 34 on the swivel pin 10, as shown in FIG. 1, with the ring 30 held upwardly with its bottom surfaces 35 spaced above the shoulder 34. At that time the hook 4, when the locking rod 25 is released from its notch in the flange of the loading plug 19, is free to turn on its bearing mounting about the vertical axial line of the swivel pin 10. When the load carrying hook is heavily loaded the "Belleville" spring 33 is partially collapsed or compressed, as shown in FIG. 5, causing the ring 32 to move downwardly to allow the bottom surface 35 of the ring 30 to contact directly the shoulder 34 so that at that time the hook is supported for non-swivelling movement directly by the swivel pin 10 independently of the anti-friction bearing 18. Thus the hook load is divided between the bearing 18 and a non-yielding surface on the support provided by the swivel pin.

When it is desired to detach the load carrying member or hook from its mounting on the traveling block the spring mounting 1 may be partially or wholly collapsed to move the swivel block 6 and its associated parts downwardly relative to the block part 2 to provide a space between the top of the retaining ring 13 and the bottom surface of the part 2. The screws 14 of the retaining ring may then be detached and the ring lifted upwardly from the split ring 12 in the space thus provided so that the split ring may be released laterally from the swivel pin and the swivel pin may be lowered downwardly through the opening 16 in the swivel block 6 to remove the hook from the block body. When the swivel pin is detached the cross pins 8 may be slid outwardly from the bores in the side portions 7 of the movable block part 3 to detach the swivel block 6 therefrom. The spring mounting and swivel bearing parts are arranged within a chamber 36 in the loading plug 19 and closed at its bottom by the hook body and this chamber may contain a suitable lubricant. By unthreading the joint between the loading plug 19 and the hook body access to the swivel bearing and spring mounting may be readily obtained.

As a result of this invention an improved traveling block is provided having a novel swivel mounting for the load carrying hook. By the provision of the spring mounting for the hook the latter when lightly loaded may swivel freely relative to the block body and upon heavy loading of the hook the spring may be compressed to transfer the heavily loaded hook from its bearing to a part of its mounting to relieve the bearing of excessive hook loads. The improved mounting structure for the hook enables the hook to be readily detached from the block body. By enclosing the swivel bearing and spring mounting within a chamber within the hook parts the bearing is protected against access to dirt and adequate lubrication may be maintained. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A traveling block comprising, a support, an annular swivel block carried by said support, a swivel pin supported in the bore of said annular swivel block, said swivel pin having a pair of spaced portions at one end of said pin, a load carrying member having a shoulder portion engaging one of said portions of said pin, anti-friction bearing means located on the other of said portions, a Belleville spring located on said anti-friction bearing means for engaging and biasing said load carrying member out of contact with said one portion of said pin.

2. A traveling block comprising, a support with a pair of leg members depending therefrom, a block element connected to said members by a pair of pins, said block element and pins being recessed for receiving a swivel pin depending therefrom, said swivel pin having a pair of spaced portions on the lower end thereof, an anti-friction bearing means mounted on one of said portions, a Belleville spring mounted on said bearing means, a load carrying member supported by said Belleville spring for transmitting the weight of said load carrying member to said swivel pin, the other of said portions being spaced from said load carrying member to assume the weight of said load carrying member upon predetermined deflection of said Belleville spring.

3. A traveling block comprising, a support with a swivel pin supported by and depending therefrom, said swivel pin having a flanged bottom portion, bearing means located on said flanged portion, a Belleville spring mounted on said bearing means, a load carrying member having a portion thereof supported by said Belleville spring, said swivel pin having a shoulder adjacent said flanged portion for engaging said load carrying member upon predetermined deflection of said Belleville spring.

References Cited in the file of this patent

UNITED STATES PATENTS

| | | |
|---|---|---|
| 1,842,638 | Wigle | Jan. 26, 1932 |
| 2,203,139 | Grau et al. | June 4, 1940 |
| 2,519,288 | Roberson | Aug. 15, 1950 |